Feb. 21, 1939.　　　　　L. F. HUNT　　　　　2,147,842

POWER LINE PROTECTIVE SYSTEM

Filed Dec. 28, 1936　　　　4 Sheets-Sheet 1

Inventor
LLOYD F. HUNT
By
His Attorney

Feb. 21, 1939.　　　　L. F. HUNT　　　　2,147,842
POWER LINE PROTECTIVE SYSTEM
Filed Dec. 28, 1936　　　　4 Sheets-Sheet 2

Inventor
Lloyd F. Hunt
By
His Attorney

Patented Feb. 21, 1939

2,147,842

UNITED STATES PATENT OFFICE 2,147,842

POWER LINE PROTECTIVE SYSTEM

Lloyd F. Hunt, Glendale, Calif.

Application December 28, 1936, Serial No. 117,816

6 Claims. (Cl. 175—294)

This invention relates to electrical protective systems and relates more particularly to protective systems for electrical distribution or transmission systems. A general object of this invention is to provide a practical, dependable, and highly sensitive protective system of the character referred to.

Another object of this invention is to provide improvements in the general type of protective equipment described in United States Letters Patent No. 1,965,896, issued to L. F. Hunt and F. B. Doolittle, July 10, 1934.

The patent referred to above discloses a protective system for an electrical distribution system that is unaffected by or unresponsive to the rather rare or infrequent balanced fault conditions and instability resulting from the synchronous machines of the system falling out of step with each other, and that is designed to function and protect the distribution system against all other fault conditions. In practice it has been found that a protective system of the character disclosed in said patent is not applicable to all installations and does not properly operate under certain conditions where the line current drops below the normal current range when a phase to phase fault occurs.

Another object of this invention is to provide a protective system of the character referred to that is sensitive to and that will operate under phase to phase fault conditions to select and clear from the distribution system sections of the line involved in such a fault, irrespective of the current carried thereby during such a fault.

Another object of this invention is to provide a protective system of the character mentioned that embodies balanced current detector relays and balanced current trip relays so related that the system will select and clear the affected line section or sections in the event of undercurrent conditions resulting from a phase to phase fault, as well as unbalanced overcurrent conditions resulting from similar faults.

Another object of this invention is to provide a protective system of the character mentioned in which the detector relays and the trip relays may be very rapid or instantaneous.

A further object of this invention is to provide a protective system of the character mentioned embodying control relays so related with the other elements of the system that they prevent premature operation of the trip relays whereby the trip relays may be very rapid or instantaneous relays.

The various objects and features of my invention will be fully understood from the following detailed description of typical preferred forms and applications of my invention, throughout which description reference is made to the accompanying drawings, in which:

Fig. 2ª is an across the wire diagram of the A. C. circuits shown in Fig. 2. Fig. 2ᵇ is an across the wire diagram of D. C. circuits shown in Fig. 2.

The protective system of the present invention is adapted for use in connection with power distributing systems in which the power is handled by means of any of the typical wiring systems used in such installations. In the following detailed description I will describe typical forms of the invention as applied to a well known type of wiring system. It is to be understood that the invention is not to be considered as limited or restricted to this particular application. Further, it is to be understood that the invention is primarily concerned with a protective sysem and is not directly concerned with the mechanical details of the various relays, transformers, or other equipment involved. Accordingly, the invention has been illustrated in a diagrammatic manner to be better understood by those skilled in the art.

Figure 1:
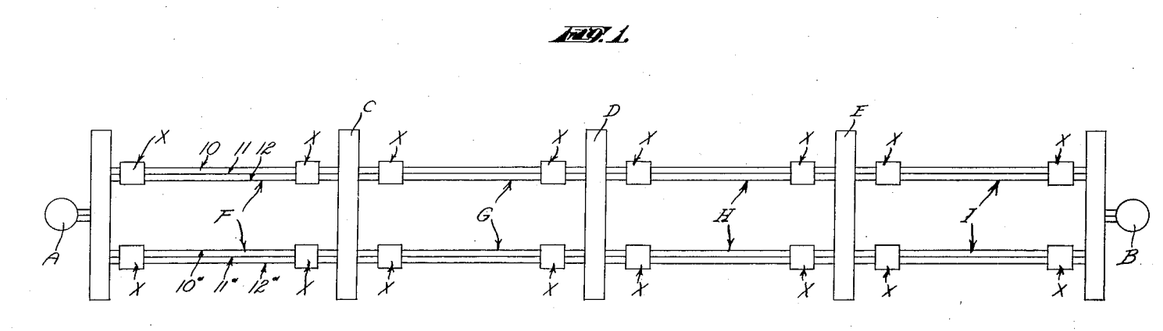
Fig. 1 is a diagrammatic view of a typical power distributing system embodying the protective system of the invention.
Figure 2:
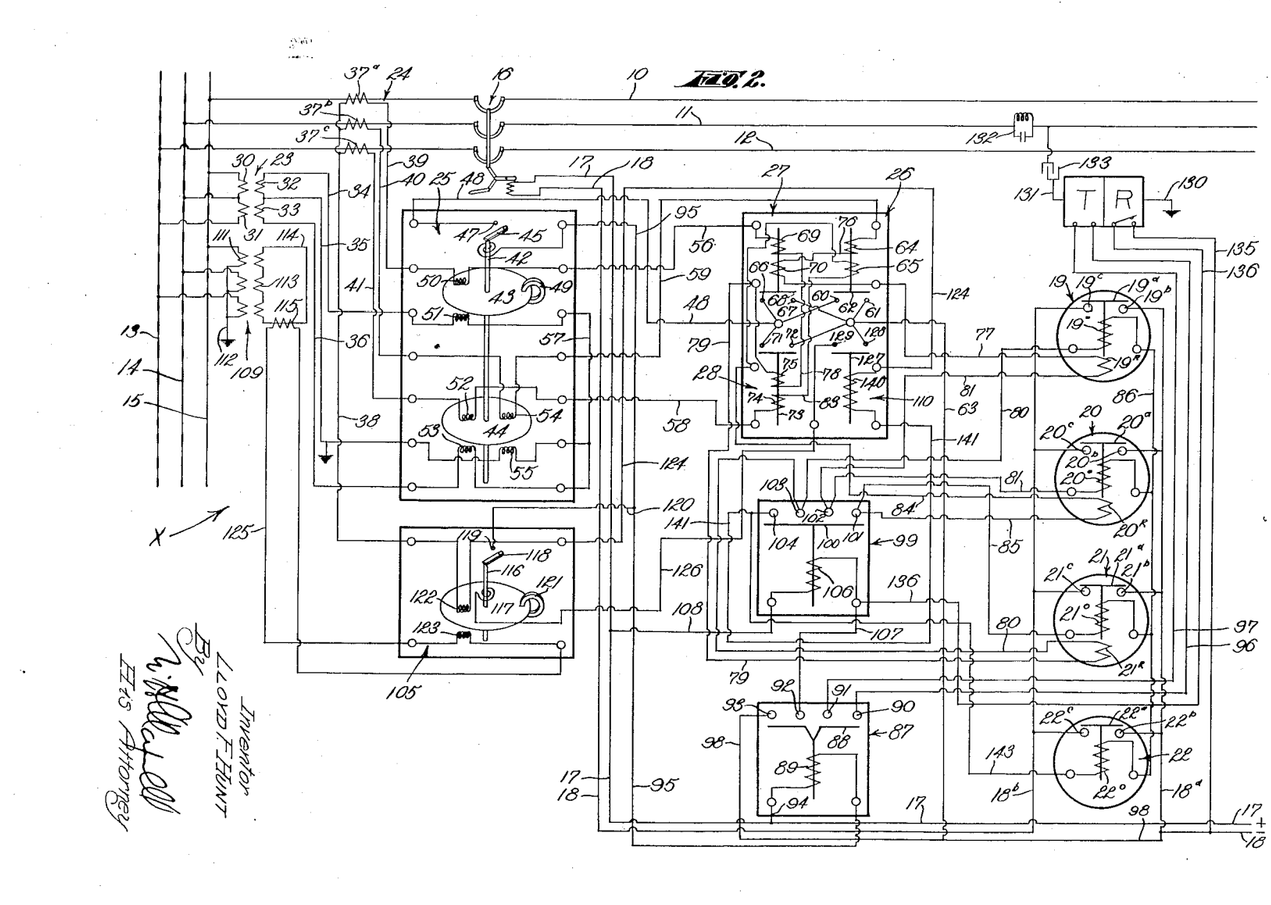
Fig. 2 is an enlarged diagrammatic view illustrating the details of one form of protective unit provided by the invention.
Figures 2A, 2B:
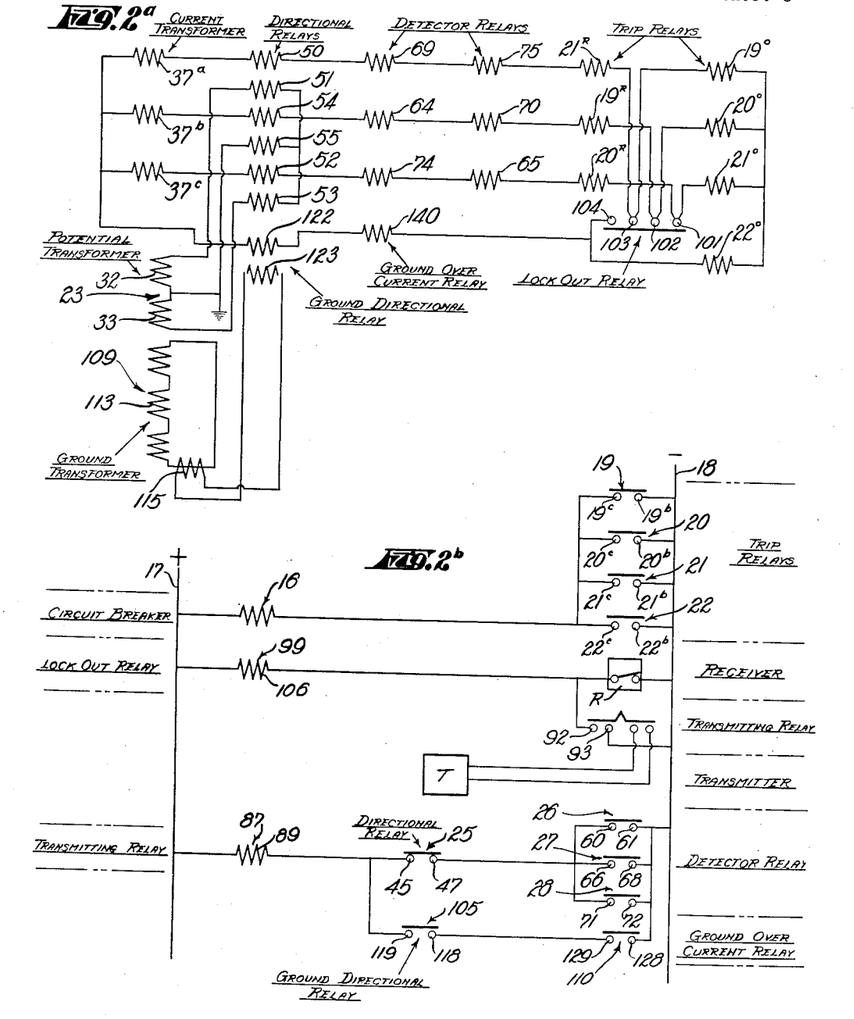
Figure 3:
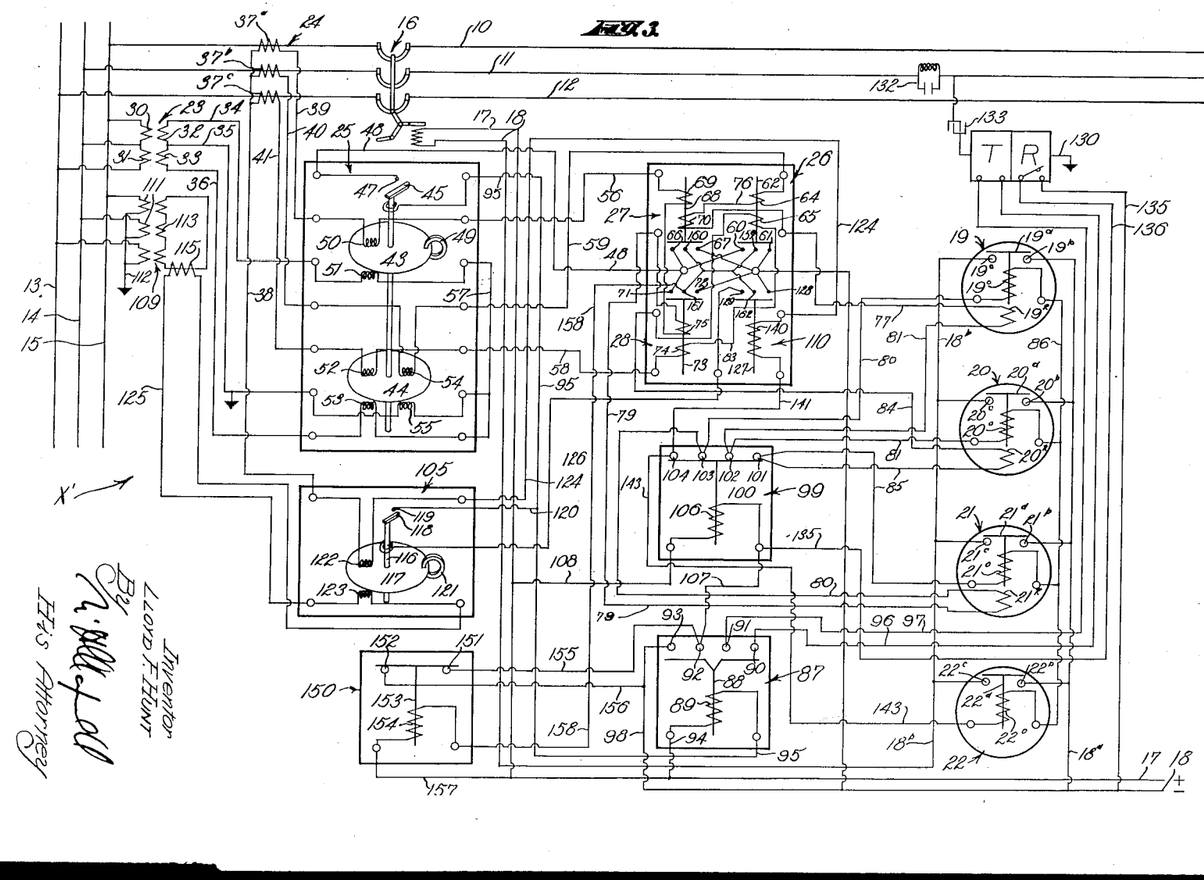
Fig. 3 is a view similar to Fig. 2 illustrating another form of unit and Fig. 4 is a more or less diagrammatic view of a type of relay that may be employed to advantage in the system.

Fig. 1 of the drawings illustrates diagrammatically a protective system of the invention as applied to a typical power distributing system while Figs. 2 and 3 illustrate different forms of units of the protective system which units embody features of the invention. The typical electrical distributing system illustrated in Fig. 1 includes two spaced sources of power A and B connected by main power conductors 10, 11 and 12 of one circuit and main power conductors 10ª, 11ª and 12ª of a parallel circuit. The circuits extending between the power sources A and B are divided by sub-stations C, D and E into a plurality of line sections F, G, H and I.

The present invention provides a protective unit X of the character illustrated in Fig. 2 at each end of each line section F, G, H and I of each of the power circuits. The several units X are interconnected by a signal system to constitute the protective system of the invention. I will first describe in detail one of the units X and will then describe its operation and its relationship to the other units X as employed in the protective system. It is to be understood that the description of this unit X is equally applicable to the other units X of the system. Following the description of the unit X illustrated in Fig. 2, I will describe in detail the unit X' illustrated in Fig. 3.

The particular protective unit X illustrated in Fig. 2 is connected with the main conductors 10, 11 and 12 of one of the main circuits being located at one of the substations C, D or E. This substation has bus bars 13, 14 and 15 connected with the main lines 10, 11 and 12, respectively.

The unit X includes a circuit breaker 16 connected with the main power lines 10, 11 and 12 ahead of the points of connection of the buss bars 13, 14 and 15 with the lines. The circuit breaker 16 is adapted to be operated by current from an outside source carried by lines 17 and 18. The energizing lines 17 and 18 of the circuit breaker 16 are controlled by trip relays 19, 20 and 21 and a trip relay 22. Closing or operation of any of the trip relays 19, 20, 21 or 22 completes the energizing circuit to the breaker 16, as will be hereinafter described.

In accordance with the invention the trip relays 19, 20 and 21 are balanced current relays. The trip relays 19, 20 and 21 include movable contacts $19^a$, $20^a$ and $21^a$, respectively, for controlling the operating circuit of the breaker 16 in the manner to be hereinafter described. The contacts $19^a$, $20^a$ and $21^a$, respectively, for controlled by operating coils $19^o$, $20^o$ and $21^o$ and restraining coils $19^r$, $20^r$ and $21^r$, respectively. The operating coils $19^o$, $20^o$ and $21^o$ and the restraining coils $19^r$, $20^r$ and $21^r$ are electrically connected with the detector relays and the control relays to be hereinafter described so that under normal line conditions current from one phase of the line section flows through the closing or operating coils of a trip relay 19, 20 or 21, tending to close its contact while current from another phase of the line section flows through the restraining coil of said relay to restrain or prevent closing of the contact.

The coils $19^o$, $20^o$, $21^o$ and $19^r$, $20^r$ and $21^r$ are supplied with current by the lines to be hereinafter described, so that an unbalanced current condition between any two main power lines 10, 11 or 12 in the line section with which the unit X is connected results in the closing or operating of one of the trip relays 19, 20 or 21. In practice the operating and restraining coils of the trip relays 19, 20 and 21 may be related so that the relays operate under any selected differential in current. For example, the restraining coils $19^r$, $20^r$ and $21^r$ may have 10% more windings than the operating coils $19^o$, $20^o$ and $21^o$ so that there must be more than 10% more current flow through the operating coils than through the restraining coils to effect the operation of the trip relays. This relationship or setting may be varied to suit various installations, etc. If desired, the restraining coils $19^r$, $20^r$ and $21^r$ may be assisted by springs tending to hold the contacts $19^a$, $20^a$ and $21^a$ against closing. In accordance with the invention the trip relays 19, 20, 21 and 22 are preferably time delay relays. The trip relay 22 includes a movable contact $22^a$ controlled or operated by a closing coil $22^o$. The contact $22^a$ may be normally held in the open position by a spring, by gravity, or by any other suitable means.

The trip relays 19, 20, 21 and 22 are connected or interposed in the operating circuit 17—18 of the circuit breaker 16 to control the same. In the particular arrangement illustrated the auxiliary power line 18 is extended to the trip relays 19, 20, 21 and 22 having two branches $18^a$ and $18^b$ between which the trip relays are connected or interposed. The trip relays 19, 20, 21 and 22 have stationary contacts $19^b$, $20^b$, $21^b$ and $22^b$, respectively, connected in the power line branch $18^a$. The trip relays 19, 20, 21 and 22 have stationary contacts $19^c$, $20^c$, $21^c$ and $22^c$, respectively, connected in the branch $18^b$ of the auxiliary power line 18. The trip relays 19, 20, 21 and 22 are normally open, that is, their movable contacts $19^a$, $20^a$, $21^a$ and $22^a$ are out of engagement with their stationary contacts so that the circuit to the circuit breaker 16 is normally open. It will be apparent that closing of any one of the trip relays 19, 20, 21 or 22 completes the energizing circuit to the breaker 16.

The means for controlling the trip relays 19, 20 and 21 described above, include a potential transformer 23, a current transformer 24, a directional relay 25 associated with the transformers 23 and 24 to be responsive to direction in current flow, detector relays 26, 27, and 28 and other relays and elements to be hereinafter described.

The current transformer 24 may be applied to the main power lines 10, 11 and 12 of the line section while the potential transformer 23 may be associated with the bus bars 13, 14 and 15, as illustrated. The potential transformer 23 has two primary windings 30 and 31 connected with the bus bars 13, 14 and 15, and secondary windings 32 and 33 connected with the directional relay 25 by connections 34, 35 and 36. The line or connection 35 is grounded. The current transformer 24 includes three windings $37^a$, $37^b$ and $37^c$ related respectively with the main power lines 10, 11 and 12. The windings $37^a$, $37^b$ and $37^c$ are connected with a common line 38 and lines 39, 40 and 41 extend from the windings $37^a$, $37^b$ and $37^c$, respectively, to the directional relay 25 about to be described.

The directional relay 25 includes a rotatable element or unit 42 carrying spaced discs 43 and 44 and carrying a contact 45. Contact 45 is adapted to engage a stationary contact 47 connected with the line 48. A fixed field element 49 is related to the disc 43 to dampen rotation of the unit 42. The operation or turning of the unit 42 is effected by windings 50 and 51 related to the disc 43 and windings 52, 53, 54 and 55 associated with the disc 44. The line 39 from the transformer winding $37^a$ is connected with one pole of the winding 50. A line 56 extends from the other pole of the winding 50 to the relay 27. The line 34 from the secondary windings of the potential transformer 23 connects with one pole of the winding 51 and a line 57 extends from the other pole of the winding 51 to one pole of each of the windings 53 and 55. The transformer line 36 is connected with the other pole of the winding 53 while the transformer line 35 is connected with the other pole of the winding 55. The transformer line 41 is connected with one pole of the winding 52 while a line 58 extends from the other pole of the winding 52 to the detector relay 28. The transformer line 40 is connected with one pole of the winding 54 and a line 59 extends from the other pole of the winding 54 to the detector relay 26.

It is an important feature of the invention that the detector relays 26, 27 and 28 are balanced current relays. The detector relay 26 includes two stationary contacts 60 and 61 and a movable contact 62 for cooperating with the contacts 60 and 61. The contact 60 is connected with the line 48 from the relay 25 while the contact 61 is connected with line 63. The movable contact 62 of the detector relay 26 is controlled by an operating winding 64 and a restraining winding 65.

The relay 27 includes two stationary contacts 66 and 67 and a movable contact 68 for cooperating with the contacts 66 and 67. The stationary contact 66 is connected with the line 48 from the directional relay 25. Stationary contact 67 is connected with the above mentioned line 63. The movable contact 68 of relay 27 is controlled by an operating winding 69 and a restraining winding 70. Detector relay 28 includes two stationary contacts 71 and 72 and a movable contact 73 for cooperating with the contacts 71 and 72. Contact 71 is connected with the line 48 from the directional relay 25 and contact 72 is connected with the line 63. The movable contact 73 of the relay 28 is controlled by an operating winding 74 and a restraining winding 75.

The above mentioned sets of operating and restraining coils or windings of the directional relays 26, 27 and 28 may be set to effect the operation of the relays under any selected differential in current in the coils. In other words the operating and restraining windings of the detector relays 26, 27 and 28 may be related so that the operating coils are capable of overcoming the restraining coils when there is a given or selected differential in current in the coils. The operating and restraining coils of the relays 26, 27 and 28 are associated with the directional relay 25 and with one another so that a detector relay 26, 27 and 28 operates when there is a differential of current of a given magnitude in any two of the main power lines 10, 11 and 12 of the line section, resulting from a phase to phase fault.

The operating coils 19°, 20° and 21° and the restraining coils 19$^r$, 20$^r$ and 21$^r$ of the trip relays 19, 20 and 21, respectively, are interconnected with the operating and restraining coils of the trip relays 26, 27 and 28. I will now describe the interconnections between the several operating and restraining coils of the trip relays 19, 20 and 21 and the detector relays 26, 27 and 28. The line 59 extending from the directional relay 25 is connected to one pole of the operating coil 64 of the relay 26. An interconnecting line 76 connects the other pole of the winding 64 with the restraining coil 70 of the detector relay 27. A line 77 extends from the other pole of the restraining coil 70 to one pole of the restraining coil 19$^r$ of the trip relay 19. A line 81 extends from the other pole of the coil 19$^r$ to one pole of the operating winding 20° of the trip relay 20. Line 59 is connected with the transformer winding 37$^b$ through the medium of the line 40 and the coil 54, as described above. Thus it is seen that the operating coil 64 of the detector relay 26, the restraining coil 70 of the detector relay 27, the restraining coil 19$^r$ of the trip relay 19, and the operating coil 20° of the trip relay 20 all carry current from the transformer winding 37$^a$ associated with the main power line 11.

The line 56 extending from the directional relay 25 and connected with the transformer winding 37$^a$ is connected with one pole of the operating coil 69 of the detector relay 27. An interconnecting line 78 connects the other pole of the winding 69 with one pole of the restraining coil 75 of the detector relay 28. A line 79 extends from the other pole of the coil 75 to one pole of the restraining coil 21$^r$ of the trip relay 21. A line 80 extends from the other pole of the restraining coil 21$^r$ to one pole of the operating coil 19° of the trip relay 19. With the connections just described the operating coil 69 of the detector relay 27, the restraining coil 75 of the detector relay 28, the restraining coil 21$^r$ of the trip relay 21 and the operating coil 19° of the trip relay 19 all carry current from the transformer winding 37$^a$ connected with the main power line 10.

The line 58 which extends from the directional relay 25 and which carries current from the transformer winding 37$^c$ is connected with one pole of the operating coil 74 of the directional relay 28. An interconnecting line 83 connects the other pole of the coil 74 with one pole of the restraining coil 65 of the detector relay 26. A line 84 extends from the other pole of the coil 65 to one pole of the restraining coil 20$^r$ of the trip relay 20. A line 85 connects the other pole of the coil 20$^r$ with one pole of the operating coil 21° of the trip relay 21. Thus it is seen that the operating coil 74 of the detector relay 28, the restraining coil 65 of the detector relay 26, the restraining coil 20$^r$ of the trip relay 20, and the operating coil 21° of the trip relay 21 are all energized by current from the transformer winding 37$^c$ associated with the main power line 12.

The operating coils 19°, 20° and 21° of the trip relays 19, 20 and 21, respectively, each have a post connected with a common line 86 which in turn is connected with the ground or common line 38 of the transformer 24 through the connections to be hereinafter described.

The invention includes a transmitting relay 87 for controlling a transmitter T. The transmitting relay 87 includes a movable contact 88, a coil 89 for operating the contact 88 and four stationary contacts 90, 91, 92 and 93 engageable by the contact 88. The operating coil 89 of the transmitting relay 87 is under the control of the directional relay 25 and the detector relays 26, 27 and 28 to be energized upon the occurrence of unbalanced current flow in the line section in only one direction. A connection 94 connects one pole of the operating coil 89 with the auxiliary power line 17. A line 95 connects the other pole of the coil 89 with the movable contact 45 of the directional relay 25. Thus upon closing of the contact 45 against the contact 47 the operating coil 89 of the transmitting relay 87 is energized to shift the contact 88 against the contacts 90, 91, 92 and 93. Lines 96 and 97 extend from the contacts 90 and 91, respectively, to the transmitter T. A line 98 connects the stationary contact 93 with the auxiliary power line 18 at a point ahead of the branch line 18$^a$.

The unit X includes a control or lock out means for locking out the trip relays 19, 20, 21 and 22. In the form of the invention illustrated this means constitutes a lock out relay 99 for short circuiting the operating coils of the trip relays 19, 20, 21 and 22. The relay 99 includes a movable contact 100 and four stationary contacts 101, 102, 103 and 104. The stationary contact 101 is connected in the line 85 supplying current to the coils 21° and 20$^r$. The stationary contact 102 is connected in line 81 supplying current to the coils 20° and 19$^r$. Contact 103 of relay 99 is connected in line 80 supplying current to the coils 19ᶜ and 21ʳ. Contact 104 is connected with the common line 38 of the transformer 24 through the medium of the ground relay 105 to be subsequently described. The movable contact 100 of the lock out relay 99 is operated by a coil 106. A lead 107 connects one pole of the coil 106 with the contact 92 of the transmitter relay 87. A lead 108 connects the other pole of the operating coil 106 with the auxiliary power line 17. Thus upon operation of the transmitter relay 87 current is supplied to the operating coil 106 of the lock out relay 99 from the lines 17 and 18 through lines 108, 107, contacts 92 and 93 and line 98. It will be seen that the lock out relay 99 is under the control of the transmitter relay 87 which in turn is governed by the directional relay 25 and the detector relays 26, 27 and 28.

The unit X further includes means responsive to phase to ground fault conditions for operating the circuit breaker 16. The ground fault responsive means includes a ground transformer 109, the ground directional relay 105, a relay 110 and the above described trip relay 22.

The ground bank or ground transformer 109 may comprise three primary windings 111 connected with the bus bars 13, 14 and 15. The primary windings 111 of the transformer 109 are connected to a common ground 112. The transformer 109 further includes secondary windings 113 connected in series in a line 114. A winding 115 is related to the line 114 to have current flow induced therein from the line 114.

The ground directional relay 105 is associated with the ground transformer 109 to be responsive to ground current which may result from a ground fault and is associated with the current transformer 24 to detect the direction of such ground current flow. The ground directional relay 105 includes a turnable element or unit 116 carrying a disc 117 and a contact 118. The contact 118 is adapted to engage a stationary contact 119. A line 120 extends from the stationary contact 119 to the line 95 which in turn extends to the coil 89 of the transmitter relay 87. A fixed field element 121 is related to the disc 117 to dampen rotation of the unit 116. The ground relay 105 includes windings 122 and 123 related to the disc 117 to effect turning of the unit 116. The common line 38 of the transformer 24 is connected with one pole of the winding 122 and a line 124 extends from the other pole of the winding 122 to the relay 110. The coil or winding 123 is connected in series with the induction coil 115 by a line 125. A line 126 extends from the movable contact 118 of the relay 105 to the relay 110.

The relay 110 is a ground overcurrent relay comprising a movable contact 127 and two stationary contacts 128 and 129 engageable by the contact 127. The stationary contact 128 of the relay 110 is connected with the above described line 63. The stationary contact 129 is connected with the line 126 extending from the contact 118 of the ground directional relay 105. The contact 127 of the relay 110 is operated by a winding or coil 140. The line 124 extending from the coil 122 of the relay 105 is connected with one pole of the operating winding 140. A line 141 connects the other pole of the winding 140 with the stationary contact 104 of the lock out relay 99. The operating coil 22ᶜ of the trip relay 22 has one pole connected with the common line 86 and has its other pole connected with the line 141 by a line 143. Thus the trip relay 22 is under the control of the ground relay 105 and the lock out relay 99. The common line 86 of the several trip relays is connected with the common line 38 of the current transformer 24 through the coil 22 and the lines connected therewith.

Each unit X of the protective system includes a transmitter T and a receiver R. The transmitter T and the receiver R of a unit X may be provided in a set as diagrammatically illustrated in the drawings. The transmitter and receiver set of the unit X has one pole connected to ground through a suitable connection 130 and may have its other pole connected with one of the main power lines 10, 11 or 12. In the case illustrated a connection 131 connects said other pole of the receiver and transmitter set with the line 11. The line 11 is provided with a radio frequency trap 132. The connecting line 131 is provided with a coupling capacitor 133. While I have illustrated a radio type of interconnection between the units X it is to be understood that other suitable forms of interconnections may be employed. The transmitter T of a unit X is associated with its transmitting relay 87 as described above, by the lines 96 and 97. A line 135 connects one pole of the receiver R with the auxiliary power line 18 while a line 136 connects the other pole of the receiver R with a terminal of the operating coil 106 of the lock out relay 99.

The operation of the protective system of the invention embodying the units X of the character described above, is as follows:

In the event there is a balanced three phase fault in any one of the line sections F, G, H, or I, or in the event there is a balanced current flow in the protective system due to instability in the main power circuit, the current in the operating coils and the restraining coils of the detector relays 26, 27 and 28 and of the trip relays 19, 20 and 21 will be balanced and the contacts of the said relays will remain open with the result that the protective system will not function.

In the event that there is a phase to phase short circuit in one of the line sections, say the line section H the units X at the opposite ends of the said section H operate in the same manner as follows: Referring to Fig. 2 it will be seen that current will flow from the bus bars 13, 14 and 15 through the transformer 24 and the circuit breaker 16, and then by the main power lines to the short circuit. The short circuit current flow through the transformer 24 induces an unbalanced secondary current in the windings 37ᵃ, 37ᵇ and 37ᶜ which are connected with the operating and restraining coils of the relays 26, 27 and 28 and of the trip relays 19, 20 and 21. The fault current flow from the bus bars 13, 14 and 15 to the short circuit is such that the direction of the secondary current in the windings 37ᵃ, 37ᵇ and 37ᶜ passes through the current coils 50, 54 and 52 of the directional relay 25 to turn the unit 42 in a direction to hold the contacts 45 and 47 open. The current in passing through the coils of the detector relays 26, 27 and 28 closes the contacts of these relays but since the contacts 60, 61, 66, 67, 71 and 72 of said relays are in series with the open contacts of relay 25, the closing of the relays 26, 27 and 28 does not result in any further action. As described above, the operating coils and restraining coils of the trip relays 19, 20 and 21 are connected in series with the operating and restraining coils of the detector relays 26, 27 and 28 so that the current passes through the coils of the trip relays as well as the coils of the detector relays. In the fault condition under consideration the current in the operating and restraining coils of at least one of the trip relays 19, 20 or 21 is unbalanced with the result that at least one of the trip relays closes its contact. Closing of the contact 19ª, 20ª or 21ª of a trip relay results in energization of the trip coil of the circuit breaker 16 by current supplied from the circuit 17—18. Tripping or opening of the breaker 16 clears the faulted line section of the main power system. The action or operation just described takes place in the units X at the opposite ends of the line section H, thus clearing the faulted section from the system.

When a phase to phase short occurs in a line section external to the line section H under consideration the direction of current from the transformer 24 is reversed in the associated relays of the units X at the ends of the line section H. This reversal of current flow in a unit X results in the closing of the contacts 45 and 47 of the relay 25. As described above, a phase to phase short circuit results in energization of at least one of the detector relays 26, 27 or 28 due to unbalanced current conditions. Closing of a relay 26, 27 or 28 results in the connection of the line 48 with the line 63, the line 48 being electrically connected with the line 95 by the closed or engaged contacts 45 and 47. The electrical connection of the line 48 with the line 63 following operation of one of the relays 26, 27 or 28, completes the energizing circuit to the relay 87 through the lines 95, 48, 63 and 94, described above. This energization of the transmitting relay 87 electrically connects contacts 92 and 93 so that energizing current is supplied to the coil 106 of the lock out relay 99 through the lines 98, 107 and 108. Energization of the lock out relay 99 results in short circuiting the operating coils of the trip relays 19, 20, 21 and 22 preventing the operation of the trip relays. The above described energization of the transmitting relay 87 puts the transmitter T into operation so that it sends a signal over the line to the receiver R of the unit X at the other end of the line. The transmitting relay 87 remains energized so long as the fault condition persists so that the trip relays are prevented from operating.

It is to be particularly noted that the detector relays 26, 27 and 28, are balanced as described above, so that they are receptive to or responsive to an unbalanced current condition of any selected or desired magnitude. Accordingly, the detector relays 26, 27, and 28, are capable of operating under any unbalanced current condition resulting from a fault in a section of the power line external to the section H or the section protected by the given unit X. This is important as it assures the proper operation of the detector relays 26, 27 and 28 under conditions where the current in the affected line section is less than the expected or normal load as well as under overload conditions. In other words the balancing of the detector relays 26, 27, 28 with any selected setting, as described above, renders the protective system more sensitive and responsive to any unbalanced current condition in a line section external to the section protected by the unit X embodying the said relays.

It is to be understood that when a phase to phase fault occurs on a line of the power system the units X at both ends of the section affected operate so that their circuit breakers 16 open. On the other hand, when a fault occurs in a line as a result of a fault in another section of the system the unit X receiving such current flow cuts out or becomes locked so that its breaker 16 cannot function and also sends a signal which is carried by the line section to the unit X at the other end of said section, which signal effects the locking out of the last mentioned unit X so that its breaker 16 does not function. A unit X receiving a signal as just described is locked out as follows: The receiver R receiving the signal completes a circuit from the auxiliary power line 18 through the line 135, and the line 136 to the coil 106 of lock out relay 99 and thence through the line 108 to the line 17. Thus the signal received serves to energize the lock out relay 99 to short circuit out the operating coils of the trip relays 19, 20, 21 and 22 so that the unit X is locked out.

In the event of a phase to ground fault on a line section protected by the units X the operation of the units is as follows: The current flow resulting from a phase to ground fault will be of sufficient magnitude to operate the relay 110 or the trip relay 22. The current supplied to the coil 122 of relay 105 by the current transformer 24 flows through line 124, coil 140, line 141 and line 143 to the coil 22° to operate the trip relay 22 and to operate the relay 110. Operation of the trip relay 22 of course results in opening of the circuit breaker 16. The operation of the relay 110 is in this case only incidental owing to the fact that the contacts 118 and 119 of the ground relay 105 are open.

In the event of a phase to ground fault on a line section external to the section protected by the unit X under consideration the current flow in the winding 122 is reversed resulting in turning of the unit 116 and closing of the contact 118 and 119. The operation of the unit X under these conditions is substantially the same as that just described except that closing of the contact 118 and 119 completes a circuit to the operating coil 89 of relay 87 through connections 94, 95, 120, 126 and 63. The relay 110 is operated by an external ground fault as well as an internal ground fault, as mentioned above. Operation of the transmitter relay 87 results in closing or operation of the lock out relay 99 which prevents closing of the relay 22 so that an external ground fault does not effect tripping of the circuit breaker 16. Closing or operation of the transmitter relay 87 due to an external ground fault does, however, result in operation of the transmitter T. The transmitter T sends a signal to the unit X at the other end of the line, as described above, to operate its lock out relay 99 to prevent operation of the trip relays by the external ground fault condition.

Fig. 3 of the drawings illustrates a form of protective unit X' embodying a control relay 150. The relay 150 operates to prevent operation of the trip relays 19, 20, 21 and 22, pending the completion of the operation of the directional relay 25, the ground relay 105 and the detector relays 26, 27, 28 and 110. The protective unit X' illustrated in Fig. 3 may be identical with the unit X described above, except that it embodies the relay 150 and lines and contacts associated with the relay 150 to effect its operation. Accordingly, corresponding reference numerals indicate corresponding elements in the protective units illustrated in Figs. 2 and 3. It is to be understood that units X' of the character illustrated in Fig. 3 of the drawings may be employed in the protective system in the same manner as the above described unit X.

The relay 150 includes two stationary contacts 151 and 152 and a movable contact 153 for cooperating with the stationary contacts. The movable contact 153 is normally in cooperation with the stationary contacts 151 and 152 and is controlled by a winding or coil 154. A line 155 connects the stationary contact 151 with the stationary contact 92 of the transmitter relay 87. A line 156 connects the other stationary contact 152 with the line 98 connected with the auxiliary power line 18. Thus when the movable contact 153 is in its normal position in cooperation with the contact 151 and 152 current is supplied to the coil 106 of the lock out relay 99 from the circuit 17 and 18 through lines 98 and 156, contacts 152, 153 and 151 and lines 155, 107 and 108. Accordingly, the lock out relay 99 is normally operated or energized to short circuit or lock out the trip relays 19, 20, 21 and 22.

The control relay 150 is associated with or controlled by the detector relays 26, 27, 28 and 110 to be operated following operation of any one of the detector relays. One pole of the operating winding 154 of the relay 150 is connected with the auxiliary power line 17 by a line 157. A line 158 extends from the other pole of the winding 154 to the detector relays 26, 27, 28 and 110. The detector relay 26 has a stationary contact 159 connected to the line 158. The relay 27 has a stationary contact 160 connected to the line 158. Detector relay 28 has a stationary contact 161 connected to the line 158 and detector relay 110 has a stationary contact 162 connected to the line 158. The contacts 159, 160, 161 and 162 are engageable by the movable contacts of the detector relays 26, 27, 28 and 110, respectively, to complete a circuit from power lines 17 and 18 through the lines 63, 158 and 157 to energize the winding 154 of the relay 150. Operation of any one of the detector relays 26, 27, 28 or 110 is accompanied by or followed by operation of the control relay 150 which in turn breaks the circuit to the coil 106 of the lock out relay 99 to allow the trip relays 19, 20, 21 and 22 to function.

The operation of the unit X' is substantially the same as the operation of the unit X described above, except that the lock out relay 99 is normally energized and remains energized to prevent operation of the trip relays 19, 20, 21 and 22 until at least one of the detector relays 26, 27, 28 or 110 has completed its operation, whereupon the control relay 150 is energized to effect de-energization of the relay 99 and to allow the trip relays to function provided the line fault occurs in the line section protected by the unit X'. Thus when a phase to phase short occurs in the line section protected by the unit X' the relay 25 and certain of the relays 26, 27 and 28 are energized by current from the transformer 24 as described above. At this time the lock out relay 99 is energized to prevent operation of the trip relays 19, 20 and 21. Immediately upon energization of a detector relay 26, 27 or 28 by phase to phase fault current the energizing circuit is completed to the coil 154 of the control relay 150 through the connections described above to operate the relay 150. Operation of the relay 150 effects the de-energization of the lock out relay 99 and immediately upon de-energization of the lock out relay 99 the trip relays 19, 20 and 21 are conditioned for operation by the phase to phase fault current in the protective unit. Thus the trip relays 19, 20 and 21 are prevented from operating until the relay 25 and a detector relay 26, 27 or 28 have completed their operations. For this reason the trip relays 19, 20 and 21 may be very rapid or instantaneous relays.

In the event of a phase to ground fault in the line section protected by the unit X' the operation is the same as just described, except that the ground relay 105 and the detector relay 110 function and following operation of the relay 110 the control relay 150 is operated to break the circuit to the coil 106 of the lock out relay 99. Immediately upon de-energization of the lock out relay 99 the trip relay 22 may function. This functioning of the relay 22 is subsequent to the complete operation of the relays 105 and 110 and, therefore, the relay 22 may be a very rapid or instantaneous relay.

Under fault conditions external to the line section protected by the unit X' the unit X' operates in the same manner as the unit X described above, the balanced trip relays 26, 27, 28 and 110 being responsive to unbalanced line conditions irrespective of the magnitude of the current. This is important as it assures the proper functioning of the protective unit under all fault conditions except balanced three phase faults and instability resulting from an out of step condition of the synchronous machines in the power circuit. When an unbalanced fault occurs in a line section external to the line section protected by the unit X' the detector relays 26, 27, 28 and 110 effect the operation of the transmitter relay 87. The relay 87 operates to energize the transmitter T to send a signal along the line to the unit X' at the other end of the line section and also operates to maintain the lock out relay 99 energized to prevent operation of the trip relays 19, 20, 21 and 22.

Figure 4:
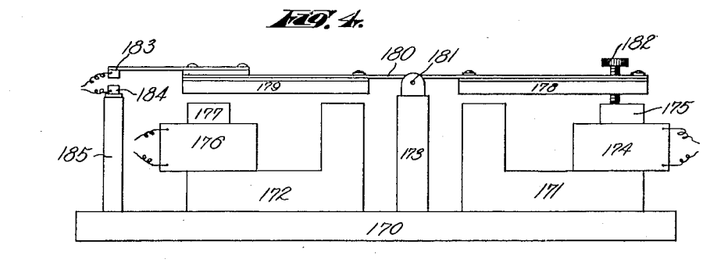

Fig. 4 of the drawings illustrates a type of balanced relay that may be employed in either of the above described protective units X or X' of the invention where balanced relays are required. In other words the balanced detector relays 26, 27 and 28 of the units X and X' and the balanced trip relays 19, 20 and 21 of X' only may be of the type illustrated in Fig. 4. It is to be understood that the structure illustrated in Fig. 4 of the drawings is merely typical of the equipment that may be employed in the system of the invention, and this disclosure is not to be taken as limiting or restricting the invention to the use of this particular form of relay.

The relay illustrated in Fig. 4 includes a suitable base 170 carrying two spaced magnets 171 and 172. A post 173 projects from the base 170 between the spaced adjoining arms of the magnets 171 and 172. A winding or coil 174 which may be considered the restraining coil is provided on the outer pole 175 of the magnet 171 and a winding or coil 176 which may be considered the operating winding is provided on the outer pole 177 of the magnet 172. Armatures or clappers 178 and 179 are carried by a lever 180 to be attracted or operated by the coils 174 and 176. The clappers 178 and 179 are suitably insulated from the lever 180. The lever 180 is pivotally supported on the post 173 at 181. The lever 180 may carry a screw 182 projecting toward the arm 175 of the magnet 171 to adjust the air gap between the clapper 178 and the magnet arm 175. The lever 180 may carry one or more insulated contacts 183 for cooperating with one or more stationary contacts 184 carried on a post 185. The coils 174 and 176 are related to normally maintain the lever 180 in a position where the contacts 183 and 184 are out of engagement. When the current in the coils 174 and 176 becomes unbalanced to a selected or predetermined degree, with the current in the operating coil greater than that in the restraining coil, the operating coil 176 overcomes the restraining coil 174 and draws the clapper 179 to the post 177 to bring the contacts 183 in engagement with the contacts 184. It will be readily understood that the coils 174 and 176 may be related to cause the operation of the relay under any desired or selected degree of differential in current supplied to or carried by the coils.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A protective system for a sectional multi-phase current carrying line including, a protective unit at each end of each line section, each unit including, current transformers for the several phases of a line section, potential transformers for the several phases of said line section, a circuit breaker, trip relays controlling the breaker and each including an operating coil and a restraining coil, a transmitting relay, balanced current detector relays, each including an operating coil and a restraining coil, each current transformer being connected with the operating coil of its related detector relay, the operating coil of each one of the detector relays being connected in series with the restraining coil of another detector relay, with the restraining coil of one of the trip relays and with the operating coil of another trip relay, a directional relay energized by the current transformers and the potential transformers, the balanced detector relays and the directional relay jointly controlling the transmitting relay whereby the transmitting relay is only operated upon the occurrence of an unbalanced fault external to the line section with which the unit is connected, a lock-out means for the trip relays, and a receiver controlling the lock-out means and receptive to the action of the transmitting relay at the other end of the said line section.

2. A protective system for a sectional multi-phase current carrying line including, a protective unit at each end of each line section, each unit including, a circuit breaker, current balanced trip relays controlling the breaker and each including a current operating coil and a current restraining coil, a transmitting relay, current balanced detector relays controlling the transmitting relay, and each including a current balanced operating coil and a current balanced restraining coil, a potential transformer for each phase of a line section, a current transformer for each phase of said line section, each current transformer being connected with the operating coil of its related detector relay, the operating coil of each one of the detector relays being connected in series with the restraining coil of another detector relay, with the restraining coil of one of the trip relays and with the operating coil of another trip relay, lock-out means for the trip relays, a directional relay connected in series with the detector relays and the transmitting relay whereby the transmitting relay is under the joint control of the directional relay and the detector relays whereby it is only operated upon the occurrence of an unbalanced line flow in one direction out of the line section, and a receiver controlling the lock-out means and governed by the transmitting relay of the unit at the end of the said line section.

3. A protective system for a sectional multi-phase current carrying line including, a protective unit at each end of each line section, each unit including, a circuit breaker, current balanced trip relays controlling the breaker and each including an operating coil and a restraining coil, current balanced detector relays each including an operating coil and a restraining coil, a potential transformer for each phase of a line section, current transformers for the several phases of said line section, each current transformer being connected with the operating coil of its related detector relay, the operating coil of each one of the detector relays being in series with the restraining coil of another detector relay, with the restraining coil of one of the trip relays and with the operating coil of another trip relay whereby a trip relay and a detector relay are operated upon an unbalanced current flow on the line section, a lock-out means for the trip relays, a transmitting relay controlling said lock-out means, an energizing circuit for the transmitting relay controlled by the detector relays, and a directional relay energized by the potential transformers and the current transformers and acting jointly with said detector relays to control said circuit whereby the transmitting relay is operated upon the occurrence of unbalanced line current flow in one direction only out of the line section.

4. A protective system for a sectional multi-phase current carrying line including, a protective unit at each end of each line section, each unit including, a circuit breaker, current balanced trip relays controlling the breaker and each including an operating coil and a restraining coil, current balanced detector relays each including an operating coil and a restraining coil, a potential transformer for each phase of a line section, current transformers for the phases of a line section, each current transformer being connected with the operating coil of its related detector relay, the operating coil of each one of the detector relays being in series with the restraining coil of another detector relay, with the restraining coil of one of the trip relays and with the operating coil of another trip relay whereby a trip relay and a detector relay are operated upon an unbalanced current flow on the line section, lock-out means for the trip relays operable by the detector relays, and a directional relay energized by the potential transformers and current transformers and acting jointly with the detector relays to control the operation of the lock-out means whereby the trip relays are not freed for operation upon the occurrence of an unbalanced current in a single direction out of the line section.

5. A protective system for a sectional multi-phase current carrying line including, a protective unit at each end of each line section, each unit including, a circuit breaker, current balanced trip relays controlling the breaker and each including an operating coil and a restraining coil, current balanced detector relays each including an operating coil and a restraining coil, potential transformers for the phases of a line section, current transformers for the several phases of said line section, each current transformer being connected with the operating coil of the related detector relay, the operating coil of each one of the detector relays being connected in series with the restraining coil of another detector relay, with the restraining coil of one of the trip relays and with the operating coil of another trip relay, whereby a trip relay and a detector relay are operated upon an unbalanced current flow on the line, a lock-out relay for the trip relays, a control relay controlling the lock-out relay and energized by the detector relays, and a directional relay energized by said current transformers and said potential transformers and acting jointly with the detector relays to govern energization of the control relay whereby the trip relays are operable upon the occurrence of unbalanced fault condition external of a given line section.

6. A protective system for a sectional multi-phase current carrying line including, a protective unit at each end of each line section, each unit including, a circuit breaker, current balanced trip relays controlling the breaker and each including an operating coil and a restraining coil, current balanced detector relays each including an operating coil and a restraining coil, a current transformer for each phase of a line section, a potential transformer for each phase of said line section, each current transformer being connected with the operating coil of the related detector relay, the operating coil of each one of the detector relays being connected in series with the restraining coil of another detector relay, with the restraining coil of one of the trip relays and with the operating coil of another trip relay, whereby a trip relay and a detector relay are operated upon an unbalanced current flow on the line section, a transmitter, a lock-out relay for the trip relays, a transmitter relay controlled jointly by the detector relays and the directional relay for energizing the transmitter and operable to actuate the lock-out relay, a normally de-energized control relay normally energizing the coil of the lock-out relay and energized by any one of the detector relays, and a directional relay energized by the potential transformers and current transformers and acting jointly with the detector relays to control the operation of the lock-out relay whereby the trip relays are freed for operation upon the occurrence of an unbalanced current line flow in a single direction out of said line section.

LLOYD F. HUNT.